United States Patent [19]

Iizuka

[11] 4,441,802
[45] Apr. 10, 1984

[54] ALBADA FINDER DEVICE

[75] Inventor: Yutaka Iizuka, Tokyo, Japan

[73] Assignee: Nippon Kogaku K.K., Tokyo, Japan

[21] Appl. No.: 266,468

[22] Filed: May 22, 1981

[30] Foreign Application Priority Data

Jun. 3, 1980 [JP] Japan ............................ 55-74539

[51] Int. Cl.³ .......................................... G03B 13/08
[52] U.S. Cl. ................................................ 354/224
[58] Field of Search ............... 354/219, 220, 224, 225; 350/410, 453

[56] References Cited

U.S. PATENT DOCUMENTS 3,517,582 6/1970 Pituley ............................ 354/219

FOREIGN PATENT DOCUMENTS 2938449 4/1980 Fed. Rep. of Germany ...... 354/224
915118 1/1963 United Kingdom ............... 354/219

*Primary Examiner*—Donald A. Griffin
*Attorney, Agent, or Firm*—Fitzpatrick, Cella, Harper & Scinto

[57] ABSTRACT

An Albada finder device includes a field frame provided on an eyepiece lens so as to be capable of reflecting part of the light from an objective lens, and a reflecting surface provided on the objective lens to reflect the reflected light from the field frame to the eyepiece lens to indicate a bright frame within the finder view field. The reflecting surface includes a central area containing the optical axis and passing light therethrough, a boundary area surrounding the central area, and a marginal area surrounding the boundary area and having a reflection factor greater than that of the central area. The boundary area has a reflection factor continuously varying so as to be smaller toward the optical axis and is formed in an annular shape having a width substantially equal to the diameter, on the reflecting surface, of a reflected light beam passing from a point of the field frame to the circumference of the exit pupil of the finder.

3 Claims, 5 Drawing Figures

ALBADA FINDER DEVICE

BACKGROUND OF THE INVENTION

1. Field of the Invention

This invention relates to improvements in an Albada optical finder.

2. Description of the Prior Art

In the general Albada optical finder according to the prior art, a mirror-surfaced field frame for a bright frame is provided toward the objective side on the eyepiece side, and a reflecting surface whose entire area half-transmits light therethrough or which was treated so that only the marginal portion thereof reflects light is provided toward the eyepiece side on the objective side, and the light rays from the field frame are reflected by the reflecting surface whereby the bright frame may be observed within the finder. FIG. 1 of the accompanying drawings is a plan view showing an example of the reflecting surface on the objective side used in such an Albada optical finder. The portion 10, indicated by hatching, is a reflecting portion for reflecting the light rays from the field frame and is formed of a surface having aluminum or the like evaporated thereon, and may be made into a complete reflecting surface or a half-mirror depending on the intended purpose thereof. The portion 20 inside the hatched portion is a transparent portion which takes in the light rays from the view field or the field frame illuminating light rays without loss. The above-described construction of the reflecting surface is such that in a case where the field frame seen in overlapped relationship with the view field, including the field frame for parallax correction, indicates only the outer peripheral portion of the photographing range, and where it is desired to have the field frame indicated also in the central portion of the view field, the reflecting portion 10 must be enlarged further inwardly, thereby making it sometimes impossible to secure the transparent portion 20. FIG. 2 of the accompanying drawings shows a variation in the reflection factor R (%) in the radial direction from the center of the reflecting surface shown in FIG. 1. A, B and C in FIG. 2 correspond to A, B and C in FIG. 1, A being the center of the reflecting surface, namely, the point of intersection between the reflecting surface and the optical axis of the finder optical system, B being the boundary between the transparent portion and the reflecting surface, and C being the end of the reflecting surface. In the reflecting surface of the prior art, $$\begin{cases} \text{in the range from A to B (transparent portion),} \\ R = 0 \\ \text{in the range from B to C (reflecting surface),} \\ R = \gamma \\ (0 < \gamma \leq 100). \end{cases}$$

An optical finger device having such a reflecting surface has suffered from disadvantages which will hereinafter be described. That is, where the boundary B is coincident with the outer periphery of the finder view field, a blurred dark portion which is not clear is formed on the outer periphery of the view field, and where the boundary B lies inside the finder view field, a blurred dark portion is formed inside the view field, and on the outside thereof, a dark portion determined by the reflection factor of the reflecting surface 10 continues. The degree of blur of the boundary portion is prescribed by the difference in visibility to the eye between the virtual image of the boundary B by the eyepiece lens and the view field image. Accordingly, in a finder having an arrangement in which such difference in visibility is relatively small, the blurred image is perceived as a clear boundary by the eye, thus providing an obstacle to the view field observation within the finder. Where this boundary lies inside the view field, it has provided a more fatal defect.

In an Albada finder, the surface of the objective lens which is adjacent to the eyepiece is a surface passing therethrough the light rays from an object being photographed and also a surface reflecting the light rays from the field frame on the eyepiece side and therefore, it is difficult to clearly observe both the image of the object being photographed and the image of the field frame, namely, the bright frame, and the above-noted disadvantages have been regarded as being inevitable in the structure of the Albada finder.

SUMMARY OF THE INVENTION

It is an object of the present invention to overcome the above-noted disadvantages and to provide an Albada finder device in which both the object image and the field frame image are bright and clear and yet the boundary between the reflecting surface and the transparent portion is not conspicuous within the finder view field and which has a clear finder view field.

According to the present invention, a reflecting surface provided on an objective lens to reflect toward the eyepiece lens of the Albada finder the reflected light from a field frame formed on the eyepiece lens has a central area containing the optical axis and passing light therethrough, a boundary area surrounding the central area, and a marginal area surrounding the boundary area and having a reflection factor greater than that of the central area, and the boundary area has a reflection factor continuously varying so as to be smaller toward the optical axis and is formed in an annular shape having a width substantially equal to the diameter, on the reflecting surface, of a reflected light beam passing from a point of the field frame to the circumference of the exit pupil of the finder.

The invention will become more fully apparent from the following detailed description thereof taken in conjunction with the accompanying drawings.

DESCRIPTION OF THE PREFERRED EMBODIMENT

Figure 1:
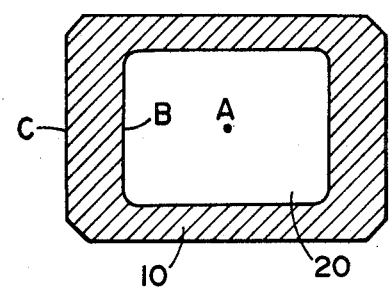
FIG. 1 is a plan view of the reflecting surface of the Albada finder according to the prior art.
Figure 2:
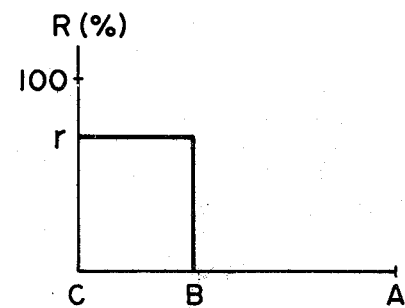
FIG. 2 is a graph showing the variation in reflection factor of the reflecting surface of FIG. 1.
Figure 3:
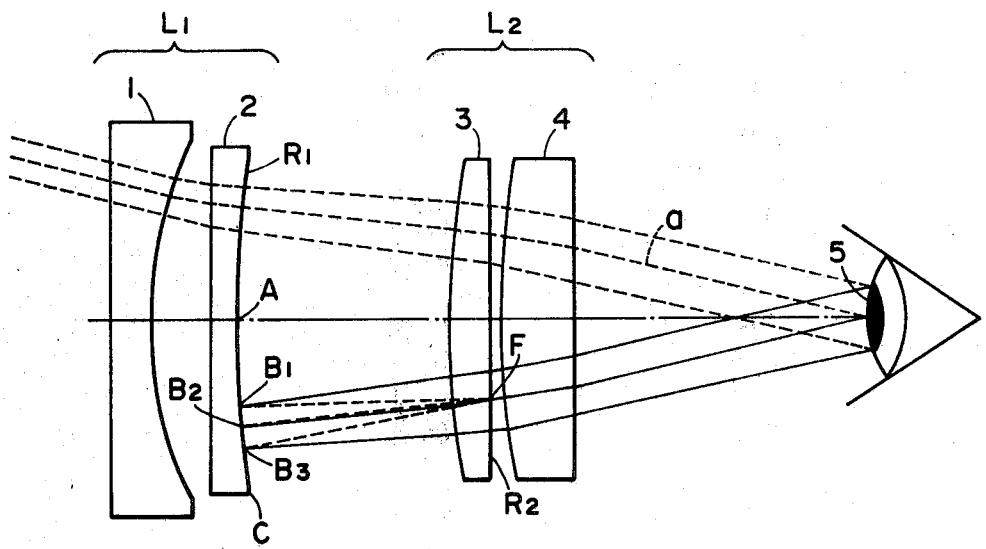
FIG. 3 is a schematic cross-sectional view of an embodiment of the present invention.

The construction of the present invention will hereinafter be described with respect to an embodiment thereof. FIG. 3 schematically shows the construction of the optical system according to an embodiment of the present invention. A so-called inverted Galilean optical finder is formed by a divergent objective lens $L_1$ comprising a first negative lens 1 and a second negative lens 2, and a convergent eyepiece lens $L_2$ comprising a first positive lens 3 and a second positive lens 4. The back surface $R_1$ of the second negative lens 2 is a concave surface on which is formed a reflecting surface to be described, and a field frame F mirror-surface toward the objective side for indicating the bright frame showing the photographing range within the finder is provided on the back surface $R_2$ of the first positive lens 3 by evaporation. The surface $R_{12}$ may preferably be formed as a planar surface for ease of working during evaporation. An eye 5 looking into the finder is placed at a position whereat the principal ray a which is an oblique ray intersects the optical axis, namely, at the position of the so-called eye point. The eye point is the position of the exit pupil of the finder optical system and in practice, with this position as the center, the entire area of the finder view field can be seen in a range in which the oblique rays enter the observing eye. The field frame F is illuminated by the light from an object which passes through the objective lens $L_1$, and the reflected light rays from the field frame F are reflected toward the eyepiece lens $L_2$ by the reflecting surface formed on the rear surface $R_1$ of the second negative lens 2 and arrive at the observing eye 5. By the reflecting action of the reflecting surface $R_1$ which is a concave surface, a virtual image of the field frame F is formed and this virtual image is observed within the finder with the same visibility as the virtual image of the observed object by the objective lens $L_1$. Of the reflected light rays from the field frame F, the rays reflected from points $B_1$, $B_2$ and $B_3$ on the reflecting surface $R_1$ pass through the eyepiece lens $L_2$ to the upper end, center and lower end, respectively, of the pupil of the observing eye 5.

Figure 4:
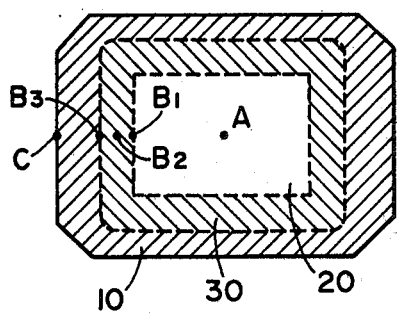
FIG. 4 is a plan view of the reflecting surface according to an embodiment of the present invention.
Figure 5:
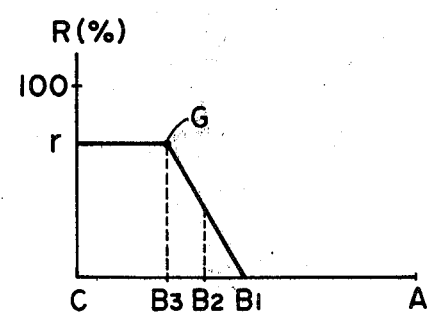
FIG. 5 is a graph showing the variation in reflection factor of the reflecting surface of FIG. 4.

The reflecting surface $R_1$, as shown in FIG. 4, comprises a marginal area 10 of a predetermined reflection factor ($\gamma$), a transparent central area 20, and a boundary area 30 lying between the marginal area and the central area and having a progressively varying reflection factor. The boundary area 30 is so formed that the reflection factor thereof becomes lower toward the inside thereof, and at its outer end $B_3$, the boundary area 30 has a reflection factor substantially equal to that of the marginal area 10 while, at its inner end $B_1$, the boundary area 30 has a reflection factor substantially equal to that of the central area 20. The variation in reflection factor R (%) in the radial direction from the center A of this reflecting surface $R_1$ is shown in FIG. 5. Points A, $B_1$, $B_2$, $B_3$ and C in FIG. 5 correspond to the identical points in FIGS. 3 and 4, and the reflection factor R of each portion is as follows:

$$\begin{cases} \text{In the range from A to } B_1 \text{ (central area) } R = 0 \\ \text{In the range from } B_1 \text{ to } B_3 \text{ (boundary area),} \\ R \text{ varies continuously.} \\ \text{In the range from } B_3 \text{ to C (marginal area), } R = \gamma \\ (0 < \gamma \leq 100) \end{cases}$$

The width of the boundary area, namely, the interval between the points $B_1$ and $B_3$, is substantially equal to the diameter, on the reflecting surface, of the reflected light beam passing from a point of the field frame to the circumference of the exit pupil of the finder. Therefore, the brightness of the field frame F observed by the observing eye 5 assumes the integrated value of the triangle $GB_3B_1$ in FIG. 5 and, on an average, is equivalent to a reflecting surface of reflection factor ($\gamma/2$), and the reflected light from the field frame is reflected to the observing eye sufficiently for observation.

Generally, the exit pupil diameter of the finder optical system is constructed in conformity with the pupil diameter of the observing eye, and is made substantially equal to or somewhat larger than the pupil diameter of the observing eye with the condition in which the observing eye lies at a right position, i.e. at the eye point as the design standard. Also, an ordinary Albada finder device is of such a construction that, as shown in FIG. 3, the light beam from the field frame F substantially reciprocates between the reflecting surface $R_1$ and the eyepiece lens $L_2$ and therefore, the diameter of this light beam on the reflecting surface $R_1$ is about ½ of the pupil diameter of the observing eye. Accordingly, the present embodiment is constructed such that the exit pupil of the finder is 4 mm which is the average value of the pupil diameter of the observing eye and that the boundary area 30 on the reflecting surface $R_1$ is about 2 mm which is ½ of said exit pupil. The pupil diameter of the observing eye is actually variable from 2 mm to maximum 7 mm and, from this point, it is desirable that the width of the boundary area of the reflecting surface in the present invention be set within a range of 1 mm to 4 mm. If the width of the boundary area is smaller than 1 mm, the variation in reflection factor is too great and therefore, the boundary between the central area and the marginal area is still conspicuous and as in the case of the prior art, the finder view field is difficult to see. Conversely, if the width of the boundary area is greater than 4 mm, the boundary becomes inconspicuous but the transmitted light from the observed object is unnecessarily decreased and the observation view field itself becomes dark although the bright frame can be observed well to some extent.

In the present embodiment, the central area 20 is made transparent to make the observation view field light, whereas substantially it need not be transparent but may be a translucent mirror as is conventional.

I claim:

1. In an Albada finder device including: a field frame provided on an eyepiece lens so as to be capable of reflecting part of the light from an objective lens; and a reflecting surface provided on the objective lens to reflect the reflected light from said field frame to the eyepiece lens to indicate a bright frame within the finder view field and including a central area containing the optical axis and passing light therethrough, and a marginal area formed around said central area and having a reflection factor greater than that of said central area; the improvement residing in that said reflecting surface further includes:

a boundary area provided between said central area and said marginal area and having a reflection factor continuously varying so as to be smaller toward said optical axis, said boundary area being formed in an annular shape having a width substantially equal to the diameter, on said reflecting surface, of a reflected light beam passing from a point of said field frame to the circumference of the exit pupil of said finder device.

2. The improvement as recited in claim 1, wherein the outside of the annulus of said boundary area has the same reflection factor as that of said marginal area and the inside of said annulus has the same reflection factor as that of said central area.

3. The improvement as recited in claim 1, wherein the width of said boundary area is about ½ of the diameter of said exit pupil.

* * * * *

UNITED STATES PATENT AND TRADEMARK OFFICE
CERTIFICATE OF CORRECTION

PATENT NO. : 4,441,802
DATED : April 10, 1984
INVENTOR(S) : YUTAKA IIZUKA

It is certified that error appears in the above-identified patent and that said Letters Patent is hereby corrected as shown below:

Column 3, line 9, "$R_{12}$" should be --$R_2$--.

Signed and Sealed this

Tenth Day of July 1984

[SEAL]

Attest:

GERALD J. MOSSINGHOFF

Attesting Officer

Commissioner of Patents and Trademarks